March 19, 1963 R. MÖHRING 3,082,328

AMPLIFYING ARRANGEMENT

Filed May 4, 1959 2 Sheets-Sheet 1

INVENTOR.

Rolf Möhring

BY

Michael S. Striker

INVENTOR.
Rolf Möhring

BY

Michael S. Striker
Atty 3,082,328
Patented Mar. 19, 1963

3,082,328

AMPLIFYING ARRANGEMENT

Rolf Möhring, Mosenstrasse 4, Dresden A19, Germany

Filed May 4, 1959, Ser. No. 810,969
7 Claims. (Cl. 250—231)

The present invention concerns a circuit arrangement for amplifying small amounts of energy, particularly electric or radiation energy. An arrangement of this type is particularly useful in the field of counting or measuring radiation where it is desirable to produce a perceptible signal, preferably an audible signal, whenever the radiation reaches a predetermined degree of intensity. Since radiation counting or measuring instruments are usually portable, it is of particular interest to have available an amplifying arrangement of maximum reliability and ruggedness, yet requiring as little space as possible and a low energy input for operation.

Known devices intended to be used for the above described purpose are rather bulky and comprise a great number of delicate components which render such devices rather expensive.

It is therefore a main object of this invention to provide a circuit arrangement of the type set forth which is comparatively simple in construction and composed of a rather small number of components so that it is rugged and reliable and may be produced at comparatively low cost.

It is another object of this invention to provide an arrangement as mentioned above which can be constructed so as to require comparatively little space.

With above objects in view, a circuit arrangement for amplifying small amounts of electric or radiation energy comprises, according to the invention, in combination, detector means responsive to input of the small amounts of energy applied thereto, auxiliary means for furnishing a pulsating electric potential at a predetermined pulse frequency, control means, operatively connected with the first detector means and with the auxiliary means, for causing the release of the pulsating electric potential from the auxiliary means substantially in proportion with the response of the detector means to an input of the small amounts of energy applied thereto, normally blocked amplifier means controlled by the pulsating electric potential and capable of releasing, upon input of a predetermined value of the pulsating electric potential, an amplified pulsating energy at the predetermined pulse frequency, and output means for delivering the amplified pulsating energy.

It is to be understood that the small amounts of energy to be amplified may be applied to this arrangement in various forms. The energy to be amplified may have the form of radiation energy like that of X-rays or rays derived from radioactive sources, or it may have the form of low, constant or pulsating potentials or of low, direct or alternating currents. The radiation energy may be applied directly to detector means forming part of the circuit arrangement according to the invention, or it may be applied to separate instruments which are connected with detector means of this circuit arrangement so as to furnish the above mentioned potentials or currents. The amplified output of the circuit arrangement according to the invention may be used only for signaling the fact that the particular type of energy, and particularly a predetermined amount thereof, has been applied to the above mentioned detector means, or, where the amplified output appears in the form of pulsations, these pulsations may be counted.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
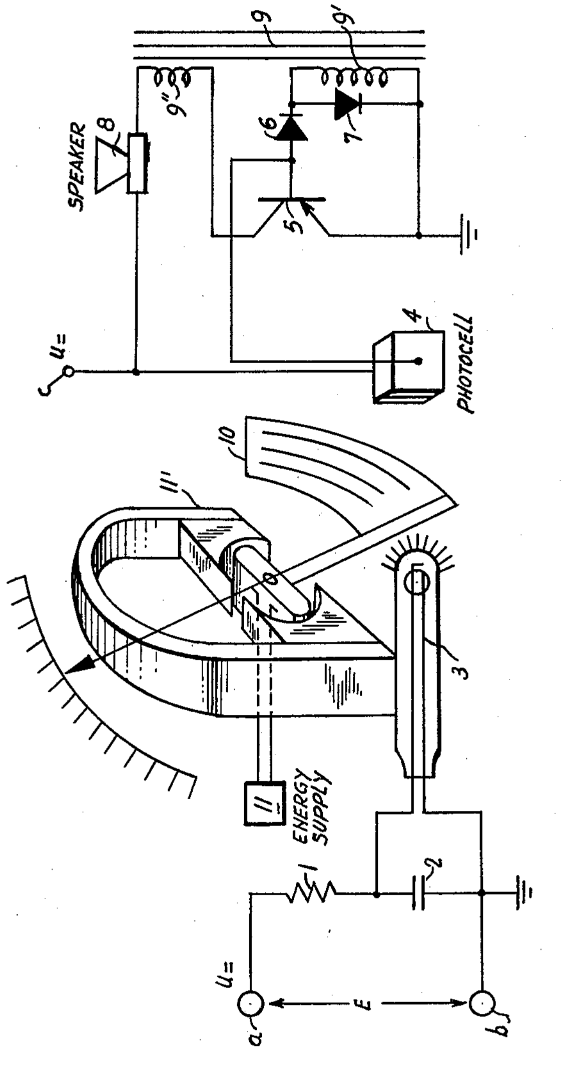
FIG. 1 is a schematic diagram illustrating one embodiment of the invention.

Referring now to FIG. 1, a moving-coil instrument 11′ is connected with an outside unit 11 furnishing the small amounts of electric energy to be amplified. Unit 11 may be any kind of a device furnishing a low electric potential or current of any type, but may also be of the type of an ionization chamber or Geiger-Mueller counter converting radiation energy into electric energy. For the purpose of this description, the instrument 11′ operates as a detector means.

Auxiliary means in this arrangement comprise a source of electric energy E assumed to be connected between two terminals *a* and *b* and furnishing a potential U capable of supplying direct current. Connected with the terminals *a* and *b* is an oscillator circuit composed of a resistor 1 and a capacitor 2 and capable of causing a glow lamp 3 of very small size, connected in parallel with the capacitor 2, to emit light pulses at a predetermined pulse frequency depending upon the relation between the potential U and the respective sizes of the resistor 1 and the capacitor 2. A preferred pulse frequency is several hundred pulses per second. The light pulses are directed at a photo-responsive device for converting the light pulses into corresponding electric pulses. The photo-responsive device is shown as a photo-cell 4 connected with one terminal to an input terminal *c* which may be connected with the terminal *a* and therefore carry also the potential U. The other terminal of the photo-cell 4 is connected with circuit means described further below.

Control means for causing the release of pulsating electric potential from the above described auxiliary means, or more particularly from the photo-cell 4, consist of a light barrier or shield 10 moved by the moving-coil of the instrument 11′ across the path of light between the glow lamp 3 and the photo-cell 4. The movement of the light barrier 10 across the light path is substantially in proportion with the response of the electro-magnetic components of the instrument 11′ to the input of energy furnished by the unit 11. The light barrier 10 is so constructed that progressive movement thereof across the light path gradually changes the intensity of the light pulses impinging on the photo-cell 4 and accordingly changes the output of pulsating electric energy available in the circuit connected with the photo-cell 4.

Arranged in circuit with the photo-cell 4 is a normally blocked blocking oscillator comprising a transistor 5 and a transformer 9. The emitter of the transistor 5 is connected to ground while the base thereof is connected to the second terminal of the photo-cell 4 and therefore acts as control electrode. One winding 9′ of the transformer is connected at one end to ground and at the other end via a rectifier 6 to the base of the transistor 5. A second rectifier or diode 7 is connected in parallel with the transformer winding 9′. The second winding 9″ of the transformer is connected between the collector of the transistor 5 and the terminal *c*. Inserted in this last mentioned connection is a second detector means which may be a relay for actuating any signaling or other devices serviced by the present circuit arrangement, or which may be a loudspeaker 8 as shown.

In operation, the current impulses caused by the photo-cell 4 at the predetermined pulse frequency of the glow lamp 3 and regulated by the light barrier 10 substantially in proportion with the amount of electric energy applied to the instrument 11' by the unit 11, are impressed on the transistor 5 so that the blocking oscillator responds to every current impulse with one oscillation. Consequently, current flows in the form of pulses at the above mentioned pulse frequency through the loudspeaker 8 thus producing an audible signal corresponding to the input of electric energy into the instrument 11'. It can be seen that the rectifier 7 prevents self-oscillation of the blocking oscillator which only responds to impulses coming from the photo-cell 4. The blocking oscillator arrangement serves as amplifier so as to furnish the amplified output required for operating the second detector means, i.e. loudspeaker 8 or a relay.

The photo-responsive device mentioned above may be of any suitable type, for instance, a photo-diode or a cadmium-sulfide cell or the like.

Figure 2:
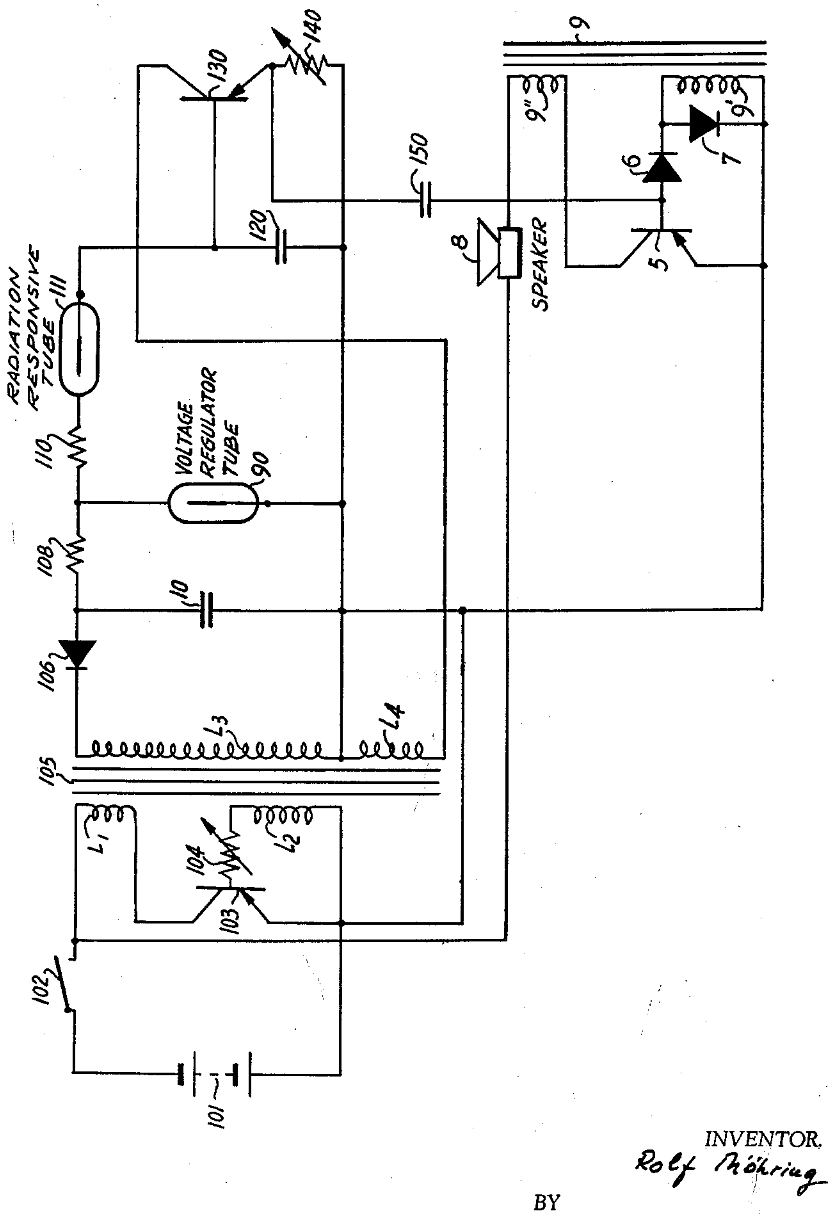
FIG. 2 is a schematic diagram illustrating another embodiment of the invention.

Referring now to FIG. 2, the auxiliary means of the embodiment illustrated by FIG. 1 are replaced by a transistor-type oscillator comprising a transistor 103 in circuit with a battery 101 as source of energy, with a control switch 102 inserted in the circuit. A winding $L_1$ of a transformer 105 is connected in the collector circuit, and a variable resistor 104 in series with another winding $L_2$ of the transformer 105 are connected between the base and the battery. The pulsating potential furnished by the above described oscillator is stepped up by the transformer and supplied to a secondary circuit including the secondary winding $L_3$, a rectifier 106, and a capacitor 70. Connected in parallel with this secondary circuit are a resistor 108 and a voltage regulator tube 90. The rectified pulsating output of the last mentioned circuit is supplied to a third circuit comprising a load resistor 110 and a radiation-responsive valve 111, e.g. a counter tube, and a smoothing condenser 120. The valve 111 acts as the detector means of the whole arrangement as will be explained below.

As a control means is connected with the above described circuit, a transistor 130 in the following manner: its base is connected to a junction point between the valve 111 and the condenser 120, and its emitter-collector circuit is connected via a variable resistor 140 with a secondary winding $L_4$ of the transformer 105. The emitter of the transistor 130 is coupled by a coupling condenser 150 with a normally blocked blocking oscillator 5, 6, 7, 9 identical with the corresponding oscillator shown in FIG. 1 and operating a detector means, e.g. loudspeaker 8 also connected in the same manner as shown in FIG. 1.

In operation, the oscillator comprising the transistor 103 produces voltage pulsations which are rectified, after transformation, by the rectifier 106. The rectified potential applied to the capacitor 70 is then stabilized by the load resistor 108 and the tube 90, whereafter the stabilized rectified potential is applied to the valve 111 via the load resistor 110. If now radiation energy is being applied to the radiation-responsive valve 111, a current is caused to flow from the valve 111, smoothed by the condenser 120 and applied to the base of the transistor 130. However, negative impulses are applied to the collector due to its connection with the secondary winding $L_4$. As soon as the control current coming from the valve 111 causes the transistor 130 to become conductive to a predetermined degree, a pulsating potential is available across the resistor 140 and is sufficient to trigger the blocking oscillator arrangement 5, 6, 7, 9 so that a pulsating output current at the pulse frequency of the voltage pulses supplied via coupling condenser 150 is furnished to the loudspeaker 8 causing the latter to deliver an audible signal accordingly.

It will be understood that each of the elements described above, or two or more together, may also find a useful application in oither types of amplifier circuits differing from the types described above.

While the invention has been illustrated and described as embodied in a circuit arrangement for amplifying small amounts of electric or radiation energy, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Circuit arrangement for amplifying small amounts of electric energy, comprising, in combination, first detector means including electro-magnetic means responsive to input of said small amounts of energy applied thereto; auxiliary means capable of furnishing a pulsating electric potential, said auxiliary means comprising a source of electric energy, glow lamp means, oscillator means energized by said source and causing said glow lamp means to emit light pulses at a predetermined pulse frequency, photo-electric cell means arranged in the path of said light pulses, and circuit means connected with said cell means and with said source for setting up an output potential pulsating at said pulse frequency; control means including a light barrier means movable by said electro-magnetic means across said path of said light pulses in predetermined proportion to said input of small amounts of energy applied to said detector means, said light barrier means being so constructed that progressive movement thereof across said path gradually changes the intensity of said light pulses impinging on said cell means and accordingly changes said output potential substantially in proportion with the response of said first detector means to an input of said small amounts of energy applied thereto; normally blocked blocking oscillator means controlled by said pulsating output potential and capable of releasing, upon input of a predetermined value of said pulsating electric potential, an amplified pulsating energy at said predetermined pulse frequency; and second detector means in circuit with said blocking oscillator means for causing the delivery of a perceptible signal indicating the input of said small amounts of energy.

2. Circuit arrangement for amplifying small amounts of electric energy, comprising, in combination, first detector means including electro-magnetic means responsive to input of said small amounts of energy applied thereto; auxiliary means capable of furnishing a pulsating electric potential, said auxiliary means comprising a source of electric energy, glow lamp means, oscillator means energized by said source and causing said glow lamp means to emit light pulses at a predetermined pulse frequency, photo-electric cell means arranged in the path of said light pulses, and circuit means connected with said cell means and with said source for setting up an output potential pulsating at said pulse frequency; control means including a light barrier means movable by said electro-magnetic means across said path of said light pulses in predetermined proportion to said input of small amounts of energy applied to said detector means, said light barrier means being so constructed that progressive movement thereof across said path gradually changes the intensity of said light pulses impinging on said cell means and accordingly changes said output potential substantially in proportion with the response of said first detector means to an input of said small amounts of energy applied thereto; normally blocked blocking oscillator means controlled by said pulsating output potential and capable of releasing, upon input of a predetermined value of said pulsating electric potential, an amplified pulsating energy at said predetermined pulse frequency; and second detector means including an electro-acoustic transducer means in circuit with said blocking oscillator means and with said cell means for causing the delivery of an audible signal indicating the input of said small amounts of energy.

3. Circuit arrangement for amplifying small amounts of radiation energy, comprising, in combination, first detector means including radiation sensitive valve means responsive to input of said small amounts of energy applied thereto; auxiliary means capable of furnishing a pulsating electric potential, said auxiliary means comprising a source of electric energy, oscillator means energized by said source and furnishing an alternating potential of predetermined frequency, rectifier means for converting said alternating potential into a train of pulses at a predetermined pulse frequency and connected in circuit with said valve means for delivering through said valve, depending upon said input of radiation energy applied to the latter, an output potential pulsating at said pulse frequency; control means including electronic means in circuit with said valve means and with said oscillator means for releasing said pulsating output potential substantially in proportion with the response of said first detector means to an input of said small amounts of energy applied thereto; normally blocked blocking oscillator means controlled by said pulsating output potential and capable of releasing, upon input of a predetermined value of said pulsating electric potential, an amplified pulsating energy at said predetermined pulse frequency; and second detector means in circuit with said blocking oscillator means for causing the delivery of a perceptible signal indicating the input of said small amounts of energy.

4. Circuit arrangement for amplifying small amounts of electric energy, comprising, in combination, first detector means including electro-magnetic means responsive to input of said small amounts of energy applied thereto; auxiliary means capable of furnishing a pulsating electric potential, said auxiliary means comprising a source of electric energy, glow lamp means, oscillator means energized by said source and causing said glow lamp means to emit light pulses at a predetermined pulse frequency, photo-electric cell means arranged in the path of said light pulses, and circuit means connected with said cell means and with said source for setting up an output potential pulsating at said pulse frequency; control means including a light barrier means movable by said electro-magnetic means across said path of said light pulses in predetermined proportion to said input of small amounts of energy applied to said detector means, said light barrier means being so constructed that progressive movement thereof across said path gradually changes the intensity of said light pulses impinging on said cell means and accordingly changes said output potential substantially in proportion with the response of said first detector means to an input of said small amounts of energy applied thereto; normally blocked transistor equipped blocking oscillator means controlled by said pulsating output potential and capable of releasing, upon input of a predetermined value of said pulsating electric potential, an amplified pulsating energy at said predetermined pulse frequency; and second detector means in circuit with said blocking oscillator means for causing the delivery of a perceptible signal indicating the input of said small amounts of energy.

5. Circuit arrangement for amplifying small amounts of radiation energy, comprising, in combination, first detector means including radiation sensitive valve means responsive to input of said small amounts of energy applied thereto; auxiliary means capable of furnishing a pulsating electric potential, said auxiliary means comprising a source of electric energy, oscillator means energized by said source and furnishing an alternating potential of predetermined frequency, rectifier means for converting said alternating potential into a train of pulses at a predetermined pulse frequency and connected in circuit with said valve means for delivering through said valve, depending upon said input of radiation energy applied to the latter, an output potential pulsating at said pulse frequency; control means including transistor means in circuit with said valve means and with said oscillator means for releasing said pulsating output potential substantially in proportion with the response of said first detector means to an input of said small amounts of energy applied thereto; normally blocked transistor equipped blocking oscillator means controlled by said pulsating output potential and capable of releasing, upon input of a predetermined value of said pulsating electric potential, an amplified pulsating energy at said predetermined pulse frequency; and second detector means in circuit with said blocking oscillator means for causing the delivery of a perceptible signal indicating the input of said small amounts of energy.

6. Circuit arrangement for amplifying small amounts of electric energy, comprising, in combination, first detector means including electro-magnetic means responsive to input of said small amounts of energy applied thereto; auxiliary means capable of furnishing a pulsating electric potential, said auxiliary means comprising a source of electric energy, glow lamp means, oscillator means energized by said source and causing said glow lamp means to emit light pulses at a predetermined pulse frequency, photo-electric cell means arranged in the path of said light pulses, and circuit means connected with said cell means and with said source for setting up an output potential pulsating at said pulse frequency; control means including a light barrier means movable by said electro-magnetic means across said path of said light pulses in predetermined proportion to said input of small amounts of energy applied to said detector means, said light barrier means being so constructed that progressive movement thereof across said path gradually changes the intensity of said light pulses impinging on said cell means and accordingly changes said output potential substantially in proportion with the response of said first detector means to an input of said small amounts of energy applied thereto; normally blocked transistor equipped blocking oscillator means controlled by said pulsating output potential and capable of releasing, upon input of a predetermined value of said pulsating electric potential, an amplified pulsating energy at said predetermined pulse frequency; and second detector means including an electro-acoustic transducer means in circuit with said blocking oscillator means and with said cell means for causing the delivery of an audible signal indicating the input of said small amounts of energy.

7. Circuit arrangement for amplifying small amounts of radiation energy, comprising, in combination, first detector means including radiation sensitive valve means responsive to input of said small amounts of energy applied thereto; auxiliary means capable of furnishing a pulsating electric potential, said auxiliary means comprising a source of electric energy, oscillator means energized by said source and furnishing an alternating potential of predetermined frequency, rectifier means for converting said alternating potential into a train of pulses at a predetermined pulse frequency and connected in circuit with said valve means for delivering through said valve, depending upon said input of radiation energy applied to the latter, an output potential pulsating at said pulse frequency; control means including transistor means in circuit with said valve means and with said oscillator means for releasing said pulsating output potential substantially in proportion with the response of said first detector means to an input of said small amounts of energy applied thereto; normally blocked transistor equipped oscillator means controlled by said pulsating output potential and capable of releasing, upon input of a predetermined value of said pulsating electric potential, an amplified pulsating energy at said predetermined pulse frequency; and second detector means including an electro-acoustic transducer means in circuit with said blocking oscillator means and with said cell means for causing the delivery of an audible signal indicating the input of said small amounts of energy.

References Cited in the file of this patent

UNITED STATES PATENTS

| | | |
|---|---|---|
| 2,434,297 | Test et al. | Jan. 13, 1948 |
| 2,453,533 | Norton | Nov. 9, 1948 |
| 2,521,479 | Rautter | Sept. 5, 1950 |
| 2,653,248 | Perlow et al. | Sept. 22, 1953 |
| 2,683,813 | Friedman | July 13, 1954 |
| 2,685,064 | Bergen | July 27, 1954 |
| 2,687,646 | Goddard | Aug. 31, 1954 |
| 2,721,276 | Exner | Oct. 18, 1955 |
| 2,838,680 | Beuder et al. | June 10, 1958 |